US008381252B2

(12) United States Patent
Young (10) Patent No.: US 8,381,252 B2
(45) Date of Patent: *Feb. 19, 2013

(54) NETWORK SYSTEMS AND METHODS TO PULL VIDEO (75) Inventor: Joel K. Young, Eden Prairie, MN (US)

(73) Assignee: Digi International Inc., Minnetonka, MN (US)

( * ) Notice: Subject to any disclaimer, the term of this patent is extended or adjusted under 35 U.S.C. 154(b) by 2324 days.

This patent is subject to a terminal disclaimer.

(21) Appl. No.: 10/621,153

(22) Filed: Jul. 15, 2003

(65) Prior Publication Data

US 2005/0015464 A1 Jan. 20, 2005

(51) Int. Cl.
*H04N 7/173* (2011.01)
*H04H 9/00* (2006.01)
*H04H 7/16* (2006.01)
*H04N 5/783* (2006.01)
*G06F 15/16* (2006.01)

(52) U.S. Cl. ............... 725/88; 725/10; 725/12; 725/89; 725/91; 725/92; 386/343; 709/219

(58) Field of Classification Search ............ 725/1.46, 725/58, 61, 12, 10, 88, 91, 92, 89; 707/1, 707/10; 386/343; 709/219
See application file for complete search history.

(56) References Cited

U.S. PATENT DOCUMENTS

| 5,892,915 | A | 4/1999 | Duso et al. |
| 6,362,856 | B1 | 3/2002 | Guzik et al. |
| 6,587,849 | B1 | 7/2003 | Mason et al. |
| 6,763,377 | B1 | 7/2004 | Belknap et al. |
| 6,763,501 | B1 | 7/2004 | Zhu et al. |
| 2001/0037511 | A1 | 11/2001 | Inagaki |
| 2001/0039659 | A1* | 11/2001 | Simmons et al. ............ 725/61 |
| 2001/0056578 | A1 | 12/2001 | Hwang et al. |
| 2002/0007485 | A1* | 1/2002 | Rodriguez et al. ............ 725/1 |

(Continued)

FOREIGN PATENT DOCUMENTS

| EP | 0817489 A2 | 1/1998 |
| EP | 1069716 A2 | 1/2001 |

(Continued)

OTHER PUBLICATIONS

U.S. Appl. No. 10/621,227: Non-Final Office Action mailed Aug. 25, 2008, 24 pgs.

(Continued)

*Primary Examiner* — Hoang-Vu A Nguyen-Ba
(74) *Attorney, Agent, or Firm* — Fogg & Powers LLC (57) ABSTRACT

A system for pulling video content over a data communications network. The system comprises at least one video display, at least one video file server containing a number of video files to be selectively displayed on the at least one video display, at least one media server to communicate with one or more video displays, a web client to communicate with each media server through a network to configure at least one playlist in the media server, each playlist including at least one identifier to select one or more of the number of video files, and each media server being adapted to pull video content from a selected video file in a selected video file server based on the playlist and to translate the pulled video content into a video output signal suitable for display on the video display.

35 Claims, 5 Drawing Sheets

U.S. PATENT DOCUMENTS

| | | | |
|---|---|---|---|
| 2002/0069418 A1* | 6/2002 | Philips | 725/87 |
| 2002/0116265 A1 | 8/2002 | Hernandez | |
| 2002/0138641 A1* | 9/2002 | Taylor et al. | 709/231 |
| 2003/0030751 A1 | 2/2003 | Lupulescu et al. | |
| 2003/0056217 A1* | 3/2003 | Brooks | 725/46 |
| 2003/0093790 A1* | 5/2003 | Logan et al. | 725/38 |
| 2003/0135857 A1* | 7/2003 | Pendakur et al. | 725/61 |
| 2005/0028208 A1* | 2/2005 | Ellis et al. | 725/58 |

FOREIGN PATENT DOCUMENTS

| | | |
|---|---|---|
| JP | 2001-230741 | 8/2001 |

OTHER PUBLICATIONS

"SMIL", *W3C Recommendation Aug. 7, 2001*, http://www.w3.org/REC-smil20-20010807/, 16 pgs.

*Air Client—Reference Guide*, Harris Automation Solutions, obtained from http://www.harris.com/support,(Dec. 1, 2002), 113 pages.

"Etere Scheduling", Etere Automation Manual, Obtained from http://www.etere.com,(Apr. 3, 2003), 2 pages.

"Integrated Solution for managing and delivering digital TV Broadcasting", *Compaq Oracle and Lysis White Paper*, Obtained from http://www.lysis.com,(Apr. 30, 1999),18 pages.

"International Search Report from corresponding PCT Application No. PCT/US2004/022771", (Nov. 22, 2004),5 pages.

"International Search Report from PCT Application No. PCT/US2004/022772 (Nov. 3, 2004)", 4 pages.

Chaney, A. , et al., "An Innovative New Solution for Shadow Browsing for Preview and Broadcast Automation", *Annual Broadcast Engineering Conference Proceedings*, (Apr. 5, 1998), 320-331.

U.S. Appl. No. 10/621,227, Non-Final Office Action mailed Sep. 19, 2007, 18 pgs.

U.S. Appl. No. 10/621,227, Amendment and Response filed Jan. 8, 2008 to Non-final Office Action mailed Sep. 19, 2007, 11 pages.

"U.S. Appl. No. 10/621,227, Response filed Apr. 9, 2009 to Final Office Action mailed Feb. 12, 2009", 12 pgs.

"U.S. Appl. No. 10/621,227, Final Office Action mailed Feb. 12, 2009", 24 pgs.

"U.S. Appl. No. 10/621,227 Final Office Action mailed Mar. 28, 2008.", 21 pgs.

* cited by examiner

NETWORK SYSTEMS AND METHODS TO PULL VIDEO

TECHNICAL FIELD

This document relates generally to networked data systems and in particular to a system and method of pulling video information over a data communications network.

BACKGROUND

As video monitors become more readily available it is becoming more desirable to provide information in video format and to distribute the video information over a non-centralized area.

Some systems distribute video information by connecting video monitors or receivers to the sources of the information by point to point connections that need long dedicated cabling systems. In point to point systems, multiple analog or digital video signals are transmitted to a number of receiving stations and a tuner is used at the receiver to select the information to display. Other systems use a data communications network to distribute the video information. A network system transmits video to a remote personal computer or server that manages the display of the video content. Thus, with either a point to point system or a network system, the receiving location controls the content that is displayed.

Controlling content at the receiving location is problematic if someone needs to control the content of multiple displays from a central location. For example, if it is desired to control the display of video content on several monitors and it is desired to have a unique playlist for each monitor, the playlist on each computer or server needs to be programmed. Also, each additional receiver of video content on the system requires another remote computer.

What is needed is an improved method of distributing video information.

SUMMARY

This document describes a network video system that provides for centralized control of creating a video playlist for remotely located video displays. The system comprises at least one video display, at least one video file server that includes a number of video files that include video content to be selectively displayed on the at least one video display, at least one media server to communicate with one or more video displays, and a web client to communicate with each media server through a network to configure at least one playlist in the media server. Each playlist includes at least one identifier to select one or more of the number of video files. Each media server is adapted to pull video content from a selected video file in a selected video file server based on the playlist and to translate the pulled video content into a video output signal suitable for display on the video display.

This summary is intended to provide an overview of the subject matter of the present application. It is not intended to provide an exclusive or exhaustive explanation of the invention. The detailed description is included to provide further information about the subject matter of the present patent application.

BRIEF DESCRIPTION OF THE DRAWINGS

In the drawings like numerals refer to like components throughout the several views.

DETAILED DESCRIPTION

In the following detailed description, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

This document discusses a system and method for distributing video content over a data communications network. An advantage of using a data network, is that the network is often already available, eliminating the need for a special video cabling infrastructure. Also, a data network is flexible, allowing more receivers to be added without necessarily requiring more cabling. According to various embodiments of the system, playlists for remote displays are configured from a central location. Video information is distributed to the network displays by pulling information over the network to the remote displays.

Figure 1:
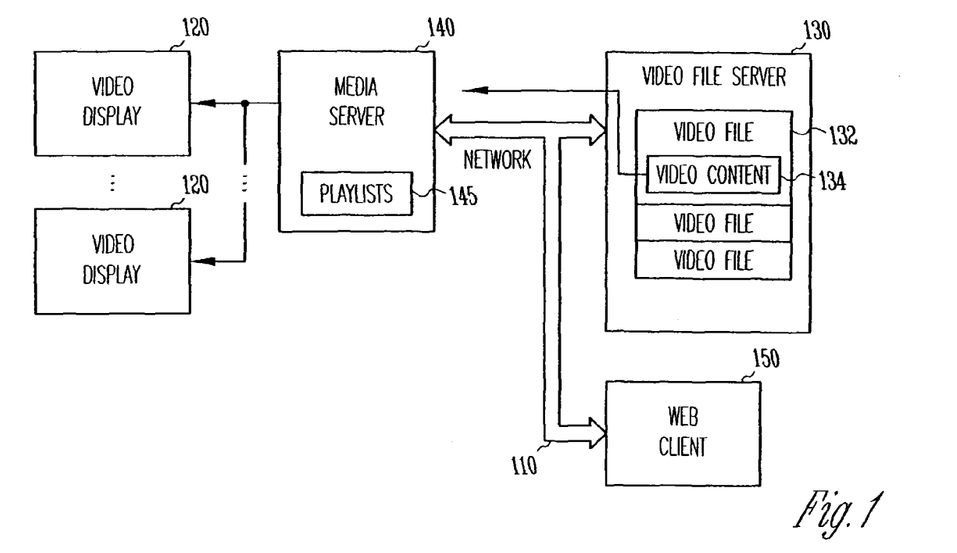
FIG. 1 shows an embodiment of a system for pulling video content over a data communications network.

FIG. 1 shows an embodiment of a system 100 for pulling video content over a data communications network 110. The illustrated system 100 includes at least one remote video display 120, a video file server 130, a media server 140, and a web client 150 to communicate with the media server 140 through the network 110. Various embodiments of a video display include a computer CRT (e.g. VGA, SVGA or XGA formats), a flat panel display, a digital flat panel display, a LCD projector, a television, a monitor, a high definition television (HDTV), or the like. The video file server 130 includes a number of video files 132 to provide video content 134 to be selectively displayed on the remote displays. The present subject matter is not limited to any particular video format. Various embodiments include Power Point, J-peg, a video clip format (E.g. MPX, AVI or M-peg) or a web video format (E.g. html, asp or flash). In some embodiments, the video files 132 also include audio content. Nor is the present subject matter limited to any particular network protocol. In one example of the various embodiments possible, the data network uses the transmission control protocol/Internet Protocol (TCP/IP) to transfer the video content 134.

The web client 150 communicates with the media server 140 through the network 110 to configure a playlist 145 or sequence of playlists 145 in the media server 140. The media server 140 controls the presentation of video content 134 on the video display 120 by executing the playlists 145. The media server 140 pulls digital video content 134 from a selected video file 132 in the file server 130 based on the playlists 145 and translates the pulled video content 134 into a video output signal suitable for display on the video display 120. The video output signal is either analog or digital, and format options include, but are not limited to, VGA, SVGA, XGA, DVI, S-video, component video and composite video.

Figure 2:
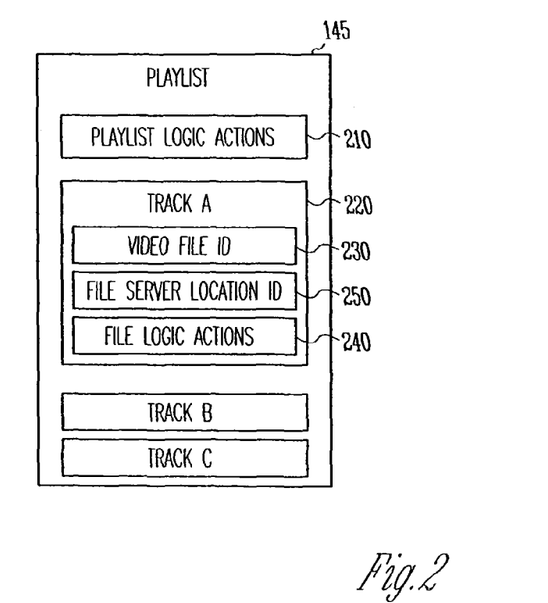
FIG. 2 shows an embodiment of a video content playlist.

An embodiment of a playlist 145 is shown in FIG. 2. Each playlist 145 includes logic actions 210 related to playing the playlist 145. The logic actions 210 include, but are not limited to, a start time of the playlist 145, a termination time of the playlist 145, a number of times to play the playlist 145, and the sequence of files in the playlist 145. The playlist 145 includes at least one track 220, or entry, that includes an identifier 230 to select one or more video files 132 from the video file server 130. In another embodiment, the track 220 also includes logical actions 240 related to playing the video content 134 of the video files 132 indicated by the track. The logical actions 240 related to the files include, but are not limited to, the duration for playing the video content 134, a number of times to repeat playing the video content 134, or direct controls over the video presentation such as start, stop, pause and play and the like. The media server 140 executes the playlist based on the logical actions 210, 240. The logical actions also include actions that are application specific to the video format. For example, if the video application is a power point presentation, the logical actions include next slide or last slide. Other application specific logical actions include play, restart, rewind, fast-forward, next file, last file, mouse click, hyperlink and go to new file list. Various embodiments of the logical actions include various combinations of the types of actions listed and other actions related to the playing of video files.

In various embodiments, the media server 140 is capable of executing in auto-mode or interactive mode or a combination of the two modes. In the auto-mode, the web client 150 configures a playlist 145 based on a sequence of logical actions 210, 240 in the form of a decision tree. Once configured the events execute on the media server 140 independently of the web client 150. To configure the playlist, one embodiment includes a user using the web client to log into a video file page on a media server 140 using a web browser and selecting files in the video file server 130 for the playlist by pointing to the files with a mouse. The logic actions are then entered using the web client 150 to control the display of the video content. Once configured, the actions execute independent of the web client 150 similar to a batch mode. The decisions in the tree include criteria internal to the media server 140 such as time of day, play duration, video file 132 and/or playlist order sequence, and also include inputs originating external to the media server 140. The decisions in the tree determine the progression the through the playlist 145. These decisions include a decision to begin playing a file or playlist, to pause a file or playlist, to continue playing a paused a file or playlist, or to jump or branch to a new sequence of files. In one embodiment, a playlist 145 is stored in the media server 140 for future access.

External inputs are received over the network 110 or other port on the media server 140. In one embodiment, an external input is received over the network 110 from the web client. In another embodiment, an external input is a prompt such as a button press or a mouse click. In a further embodiment, an external input is from a sensor, such as a motion or proximity sensor. This further embodiment is useful to trigger execution of a playlist 145 on a system 100 installed, for example, in a department store or gas station when a sensor detects the presence of a customer near the video display 120.

The external inputs are decoded and mapped to the application specific commands. For example, a sensor input could be mapped to a mouse click to begin, continue, or jump to a presentation for a power point application, or the sensor input could be mapped into a play command for an M-peg application. A push button or mouse available at the point of display is useful to interrupt the playlist 145. Also, an external input is able to determine a sequence of play in a playlist 145. For example, if video file A is currently playing, an occurrence of an external input determines if video file B or video file C is played next. In another example, there are two external inputs, B and C, which determine the next file that plays. External input B causes video file B to play next and external input C causes video file C to be played. These examples show that various embodiments of the external inputs are useful to provide some control of the playing of video content 134 at the location of the video display 120. If the playlist 145 is interrupted locally, the system 100 has the option to restart the playlist 145 by sending an external input from the web client 150.

Figure 3:
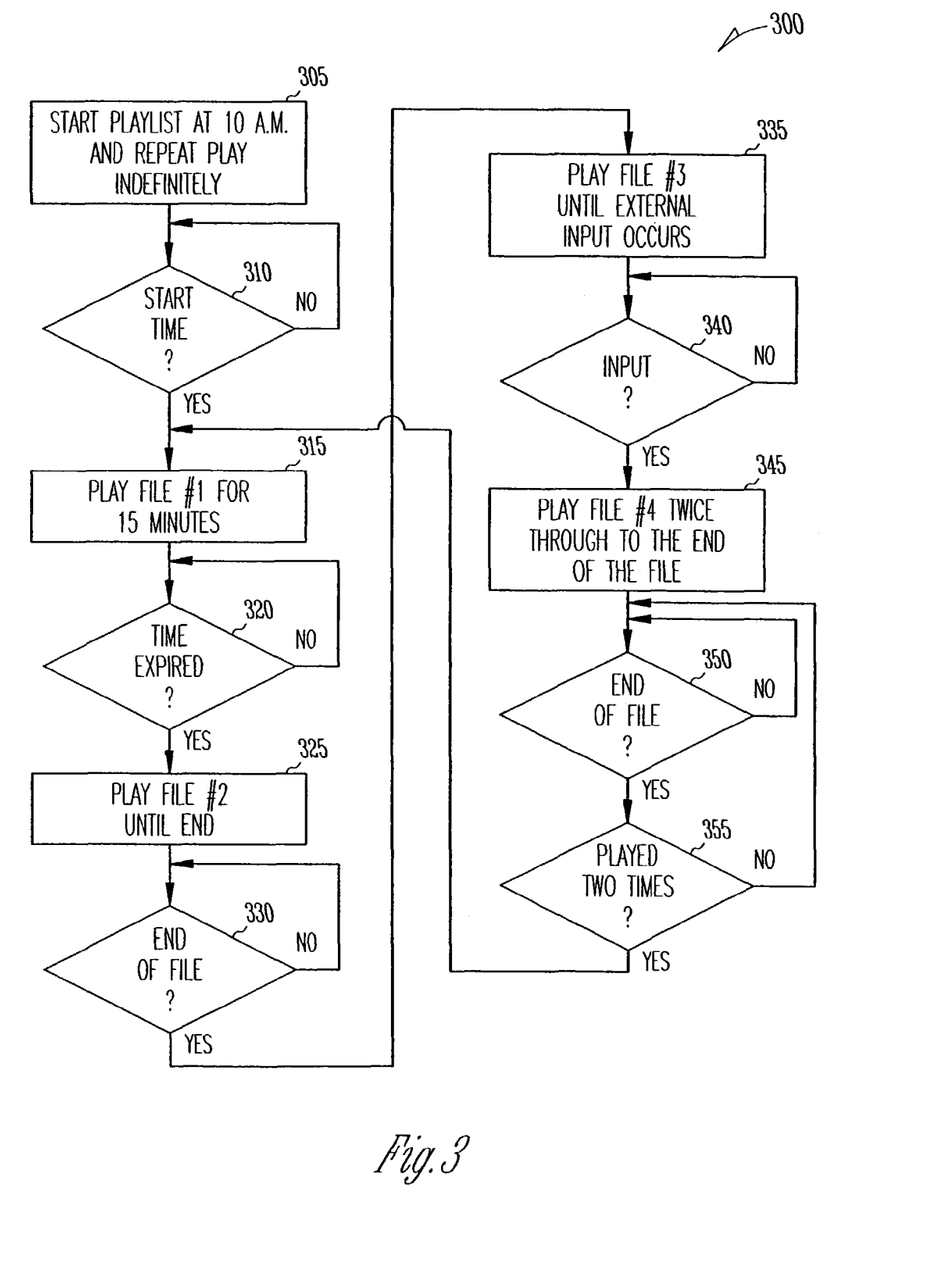
FIG. 3 shows an example of a decision tree.

FIG. 3 shows an example of an auto-mode decision tree 300 formed from logical actions 210, 240. At 305, the playlist 145 is configured to start at ten AM and play indefinitely. At 310, the time is checked and a decision is made whether to start the playlist 145. At 315, the first video file is identified which is configured to start and play for fifteen minutes. The media server 140 pulls the video file 132 from the file server 130 and begins displaying the video content 134. At 320, the playing time is checked for expiration and a decision is made whether to continue on in the playlist 145.

At 325, the second video file is identified which is configured to play until the end of the file. The video file is pulled by the media server 140 from the same or a different file server 130, and at 330, the media server 140 waits for the end of the file before proceeding in the playlist 145. At 335, the third video file is identified which is configured to play until an input external to the media server 140 occurs. At 340, the media server 140 waits for the external event before proceeding in the playlist 145. At 345, the fourth file is identified which is configured to play the video content 134 twice through to the end of the file. At 350, the media server 140 waits for the end of the file. At 355, the media server 140 checks if the file has been played twice. If not, the media server 140 loops back in the tree 300 to play the fourth file again. If it is the second time the file was played, the media server 140 loops back in the tree 300 to pull the first video file and continue the display.

An example configuration implementing the decision tree of FIG. 3 is shown below in Table 1. The configuration shows that the video files 132 are of different types and that they reside on different video file servers 130. The configuration also shows that playing the files continues until one of several possible events occurs.

In another embodiment of the media server 140 executing in the auto-mode, a computer on the network plays the role of the web client 150 in configuring a playlist 145 on the media server 140. This is done by an application on the computer downloading an existing playlist 145 from the media server 140. Examples of such an application include a web browser and a custom application written to perform the downloading and editing. The network computer edits the playlist 145 and then uploads the new configuration to the media server 140.

In the interactive mode, the web client 150 controls the playing of video content 134 by the media server 140 in real time via a web interface to the network 110. In one embodiment, the web client logs into a video file page on the media server 140 using a web browser and accesses a playlist in interactively. Play is controlled by the web client 150 executing application specific logic actions of the type discussed previously.

TABLE 1

| Playlist 1 | | | |
|---|---|---|---|
| Start: 10:00:00 | | Repeat: Indefinitely | |
| File | Location | Play | No. of times |
| 1. Picture1.jpg | Server1.com | 00:15:00 | 1 |
| 2. Video1.mp1 | Server2.com | Until End | 1 |
| 3. Picture2.jpg | Server1.com | Until Input | Loop |
| 4. Video2.mp2 | Server1.com | Until End | 2 |

Figure 4:
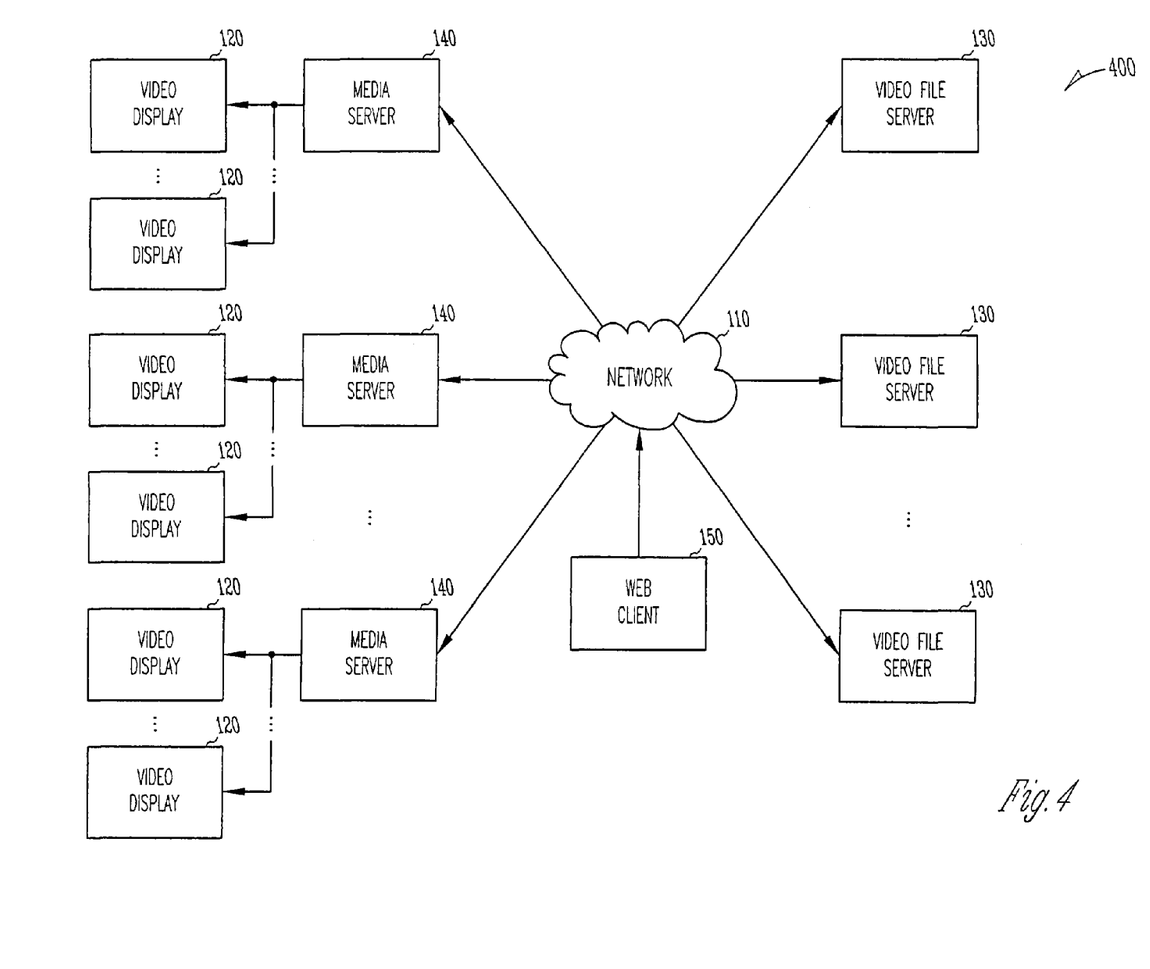
FIG. 4 shows another embodiment of a system for pulling video content over a data communications network.

FIG. 4 shows another embodiment of a system 400 for distributing video content over a data communications network 110. In the embodiment, web client 150 configures playlists on a plurality of media servers 140 over network 110, and video files 132 reside on a plurality of video file servers 130. In the embodiment, the playlists 145 configured on the media servers 140 include at least one identifier 250 to select one or more of the video file servers 130. Video file servers 130 can exist in any physical relation to the media servers 140 as long as they can communicate by the network 110. Thus, the embodiment shows that control over a wide and varied network originates from a central location.

In one embodiment of a department store system, an employee in a department store is able to use a web client 150 to configure a media server 140 to display video content on monitors at gas pumps outside of the store and from the same location configure another media server 140 to display content on televisions located in an electronics department inside the store. In another embodiment, if the network 110 is part of a nationwide department store chain, a user in a first city could use a web client 150 to configure playlists in a second city and a media server 140 could pull video content 134 from a file server 130 located in a third city for display.

In another embodiment, the system 400 is part of a home entertainment system. Media servers 140 are located in multiple locations in a home containing a communications network 110. A playlist 145 can be configured for each media server 140 to play video content 134 in one location of the home and video or audio content in MP3 or WAV format, or the like, in another part of the home.

The department store system and home entertainment system are provided as examples of applications and are not intended to be an exhaustive listing of applications for the present subject matter.

Figure 5:
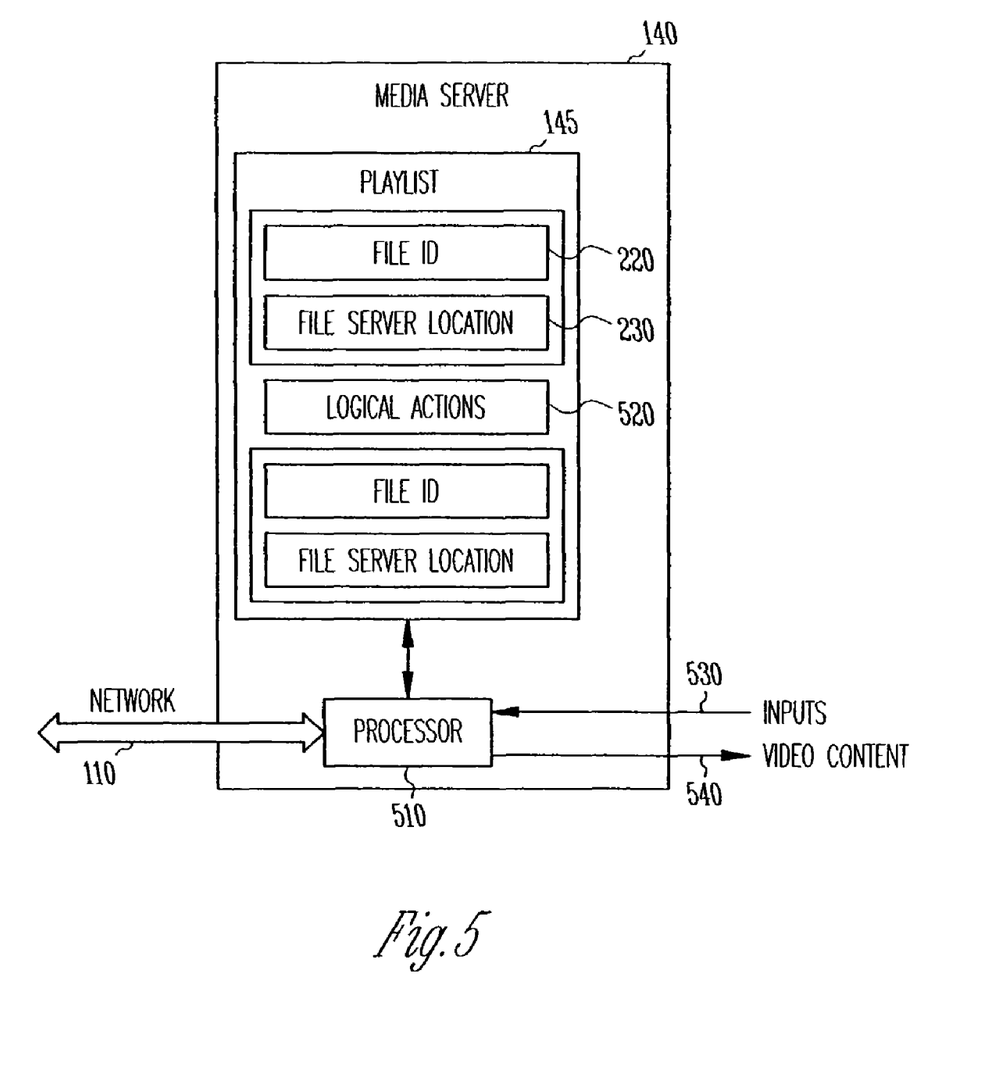
FIG. 5 shows an embodiment of a media server.

FIG. 5 shows an embodiment of a media server 140. The media server 140 comprises at least one playlist 145 and a processor 510. Playlist 145 includes a list of identifiers 220 for video files 132; each video file 132 includes video content 134 to be selectively displayed on at least one video display 120. If a media server 140 communicates to more than one video display 120, the video content 134 displayed is the same on all displays 120, or the content 134 displayed on one display is a fraction of the content displayed on another. The playlist 145 also includes a file server location identifier 230 and logical actions 520 associated with initiation of display and termination of display of the selected video content. The processor 510 executes software to retrieve the selected video content 134 according to the playlist 145 and to function as a conversion agent to translate the selected video content 134 into a video output signal 540 suitable for display. In one embodiment, the media server 140 buffers a portion of the video file 132 in a memory as the video content 134 is converted into an output signal 540. In another embodiment, the media server buffers the entire file. Inputs external to the media server 140 are communicated over the network 110 or by another input port 530.

Figure 6:
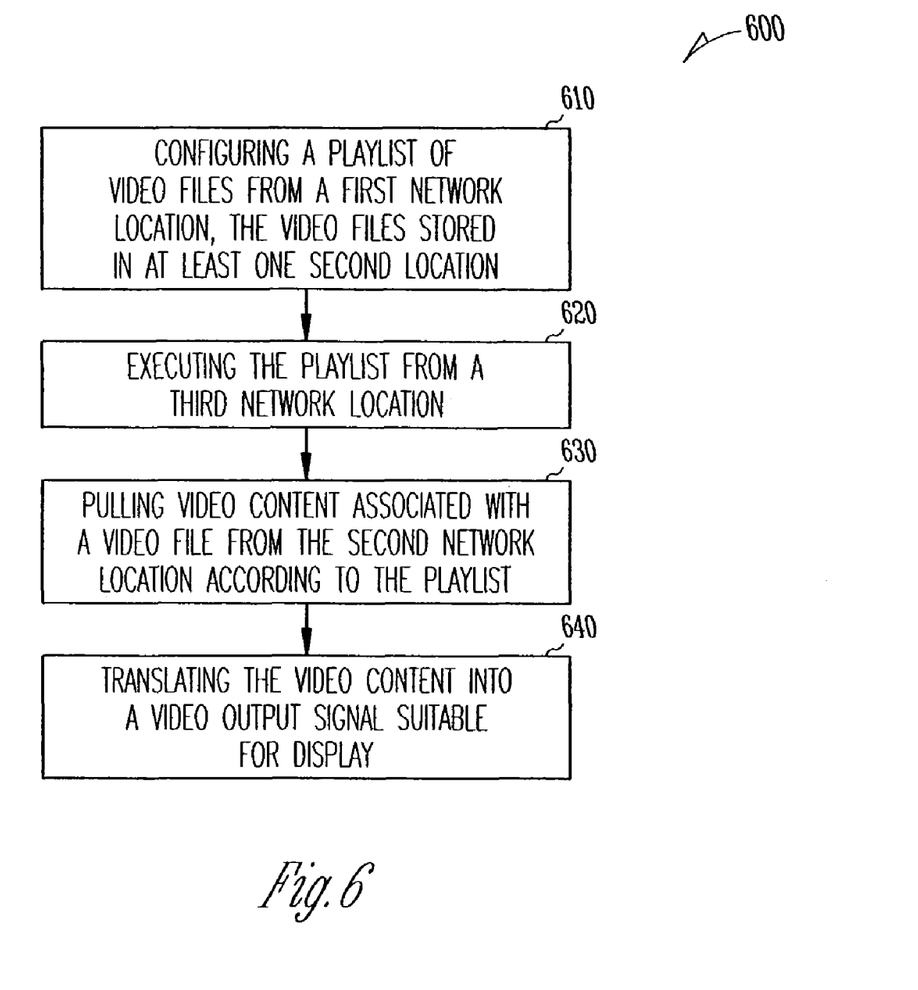
FIG. 6 shows an embodiment of a method of pulling video information.

FIG. 6 shows an embodiment of a method 600 of distributing video information. At 610, a playlist 145 of video files 132 is configured from a first network location, such as a web client 150, and the video files are stored in at least a second network location, such as a file server 130. At 620, the playlist 145 is executed from a third network location, such as a media server 140. At 630, the video content 134 associated with a video file 132 is pulled from the second network location according to the playlist. At 640, the video content 134 is translated into a video output signal 540 suitable for display.

Although specific examples have been illustrated and described herein, it will be appreciated by those of ordinary skill in the art that any arrangement calculated to achieve the same purpose could be substituted for the specific example shown. This application is intended to cover any adaptations or variations of the present invention. Therefore, it is intended that this invention be limited only by the claims and the equivalents shown.

What is claimed is:

1. A system, comprising:
at least one video file server, each video file server including a number of video files, each video file including video content to be selectively displayed on the at least one video display;
a plurality of media servers connected to the video file server over a network, each media server to communicate with one or more video displays;
a web client remote from the video file server and the media servers and configured to communicate with each media server through the network to configure at least one playlist in the media server using a web browser to log into a video file page on the media server and selecting files in the video server for the playlist, each playlist including a list of identifiers of video content in the video file server and logical actions related to playing the playlist, wherein the playlist includes at least one track, wherein the track includes an identifier to select one or more of the number of video files and includes at least one logical action related to playing the playlist; and
each media server configured to:
execute the playlist to control video content on the one or more video displays,
pull video content over the network from two or more video files according to the playlist, and
convert the pulled video content into a video output signal suitable for display as a function of the logical actions in the playlist.

2. The system of claim 1, wherein the logical actions execute in the media server as a decision tree.

3. The system of claim 2, wherein the media server executes the at least one playlist based on the logical actions in the playlist, and wherein the logical actions are configured at least in part by the web client.

4. The system of claim 3, wherein the logical actions are configured at least in part in real time by a user using the web client.

5. The system of claim 3, wherein logical actions further include inputs external to the media server.

6. The system of claim 5, wherein the inputs external to the media server are mapped into application specific commands according to the format of the video file.

7. The system of claim 6, wherein the inputs external to the media server include a motion sensor.

8. The media server of claim 6, wherein the inputs external to the media server include a proximity sensor.

9. The system of claim 1, wherein the logical actions further include a timed duration of playing the files.

10. The system of claim 1, wherein the logical actions further include a time to initiate playing the files.

11. The system of claim 1, wherein the logical actions further include a time to terminate playing the files.

12. The system of claim 1, wherein the logical actions further include a number of times to play the files.

13. The system of claim 1, wherein the video file further includes audio content.

14. The system of claim 1, wherein the video content includes any combination from the set of Power Point, J-Peg, Video Clip, or Web formats.

15. The system of claim 1, wherein the media server and the video display are included in a point of sale device.

16. A media server, comprising:
a memory configured to store:
  a video file page configured to receive playlist selection via a remote web browser; and
  at least one playlist, each playlist including:
    a list of identifiers for video files, each video file including video content to be selectively displayed on at least one video display, wherein an identifier is included in a track;
    a file server location of the video files; and
    logical actions related to playing the selected video content, wherein the logical actions include direct controls over the presentation of the video content, wherein at least one logical action is included in a track; and
a processor executing software to receive input via the web browser and execute the playlist and retrieve the selected video content from two or more video files over a network according to the playlist and to function as a conversion agent to translate the selected video content into a video signal suitable for display as a function of the logical actions in the playlist.

17. The media server of claim 16, wherein the processor executes the at least one playlist based on the logical actions and wherein the logical actions depend in part on inputs external to the media server.

18. The media server of claim 17, wherein the inputs external to the media server are mapped into application specific commands depending on the format of the video file.

19. The media server of claim 18, wherein the application specific commands include any combination from the set of Play, Restart, Pause, Stop, Rewind, Fast Forward, Next File, Next Slide, Previous Slide, Mouse Click, Hyperlink and Go To New Playlist.

20. The media server of claim 19, wherein the inputs external to the media server include messages received from the network.

21. The media server of claim 19, wherein the inputs external to the media server include one of a proximity sensor and a motion sensor.

22. The media server of claim 19, wherein the inputs external to the media server include a prompt.

23. The media server of claim 16, wherein the at least one playlist is stored on the media server.

24. The media server of claim 16, wherein the media server includes a memory capable of storing a video file.

25. A method of distributing video information, comprising:
from a first network location, configuring a playlist of video files, the video files being stored in at least one second network location remotely connected to the first network location via the network and the playlist configured in a third network location remotely connected to the first and second network locations via the network, wherein the playlist is configured by logging into a video file page of the third network location with a web browser and selecting video files stored in the second network location; and
from the third network location, executing the playlist, including:
  pulling video content associated with two or more video files from the second network location over the network according to the playlist;
  translating the video content at the third network location into a video output signal suitable for display; and
  executing logical actions included in the playlist, wherein the playlist includes at least one track, wherein the track includes an identifier to select one or more of the number of video files and includes at least one logical action related to playing the playlist.

26. The method of claim 25, wherein executing logic actions includes the third location receiving external inputs that are mapped into application specific commands.

27. The method of claim 26, wherein executing logic actions includes the third location receiving logic actions from the first location.

28. The method of claim 26, wherein the application specific commands include any combination from the set of Play, Restart, Pause, Stop, Rewind, Fast Forward, Next File, Next Slide, Previous Slide, Mouse Click, Hyperlink and Go To New Playlist.

29. The method of claim 25, wherein the first network location includes a web client.

30. The method of claim 25, wherein the second network location includes a video file server.

31. The method of claim 25, wherein the third location includes a media server.

32. The method of claim 31, wherein the first network location includes a computer and configuring a playlist includes:
  downloading an existing playlist from the media server at the third location to the computer;
  editing the playlist; and
  uploading the edited playlist from the computer to the media server.

33. A system, comprising:
at least one video file server, the video file server including a number of video files, each video file including video content to be selectively displayed;
a plurality of media servers communicatively coupled to the video file server over a network, each media server communicatively coupled to at least one video display;
a web client remote from the video file server and the media servers and configured to communicate with each media server through the network to configure a sequence of playlists on each media server by logging into a video file page on the media server with a web browser and selecting files in the video server for the playlists, each playlist including a list of identifiers of video content in the video file server and logical actions related to playing the playlist, wherein the playlist includes at least one track, wherein the track includes an identifier to select one or more of the number of video files and includes at least one logical action related to playing the playlist; and
each media server configured to:
  execute the sequence of playlists to control video content on the video display;
  pull video content over the network from two or more video files according to the playlist; and
  convert the pulled video content into a video output signal suitable for display on the video display as a function of the logical actions in the playlist.

34. The system of claim 33, including a plurality of video file servers communicatively coupled to the network, wherein a media file server is configured to pull video content over the network from more than one video file server according to a video file server identifier included in the playlist.

35. The system of claim 33, wherein the web client is configured to access the playlist on a media server interactively while the playlist is executing.

* * * * *